Oct. 18, 1949.   T. ZUSCHLAG   2,485,343
MULTIPLE INDICATING SYSTEM
Filed April 20, 1946   2 Sheets-Sheet 1

INVENTOR
THEODORE ZUSCHLAG
BY
Pennie, Edmonds, Morton & Barrows
ATTORNEYS

Oct. 18, 1949.　　　　　T. ZUSCHLAG　　　　　2,485,343
MULTIPLE INDICATING SYSTEM
Filed April 20, 1946　　　　　　　　　　　　2 Sheets-Sheet 2

INVENTOR
*THEODORE ZUSCHLAG*
BY
*Pennie, Edmonds, Morton & Barrows*
ATTORNEYS

Patented Oct. 18, 1949

2,485,343

UNITED STATES PATENT OFFICE 2,485,343

MULTIPLE INDICATING SYSTEM

Theodore Zuschlag, West Englewood, N. J., assignor to Magnetic Analysis Corporation, Long Island City, N. Y., a corporation of New York Application April 20, 1946, Serial No. 663,689

5 Claims. (Cl. 177—351)

This invention relates to indicating methods and systems for simultaneously indicating several different measurements or values.

By means of the invention it is possible to indicate for quick observation on a single screen or dial the approximate magnitudes, or deviations from preselected or normal magnitudes, of a large number of diversified measurements or values which otherwise would necessitate the reading of an equally large number of separate dials or indicating devices.

In brief, the invention comprises an indicating system including an oscilloscope on which a large number of miscellaneous measurements or values are visually indicated preferably as spaced vertical lines, each line representing a different measurement or value. According to one aspect of the invention the length of the lines may represent the magnitudes of the indicated values, and according to another aspect of the invention the system may be pre-adjusted so the lines have the same length when all of the values are of normal magnitudes, whereby any deviation of a given line from the common length will at once be strikingly apparent and will indicate an increase or a decrease of the corresponding value from the preselected norm.

The invention includes circuit arrangements which produce indicating lines extending either up or down from a horizontal zero axis, or both up and down, and if the lines extend up and down alternately, twice as many lines can be indicated on a given oscilloscope with equally good visibility.

Of the wide variety of possible applications of the present invention two will here be mentioned by way of illustration. In the aeronautical field, as aircraft have been further developed the number of indicating instruments required has grown in proportion, until today on a large airplane, 30 to 40 instruments or dials must be watched by one or two men who are charged with many other duties in connection with operating the airplane. Attempts have been made to consolidate or combine such instruments; and certain other proposals have comprised mechanical or electromechanical systems for indicating the more critical values on a single dial. However, these are not reliable and have not been successful, so the industry still relies on observation of substantially as many dials as there are values to be indicated.

In the power-generating field, it is necessary to employ electric meters in power-houses and sub-stations to indicate the voltages and loads on the various lines. As a result, it is customary to employ a very large number of meters which must be watched constantly, especially at certain times of the day, so that the generators which furnish the current to these lines may be adjusted, and interconnected when required, to maintain the correct line voltages and equalize the loads on the generators. In this instance, as in the case of the operation of an airplane, it is usually not necessary to know the actual magnitudes of the values indicated by the meters or indicating instruments, but merely to know when one of them, and which one, deviates from normal. Here, again, complicated systems have been devised in which indicating lamps or bells, or both, are actuated to call the attendant's attention to the undesired deviation or abnormal condition, but such "tell-tale" systems are more complicated, expensive, bulky and much less flexible in their capabilities than the indicating system provided by this invention.

A clearer understanding of the invention may be had by reference to the following description together with the accompanying drawings wherein.

Figure 1:
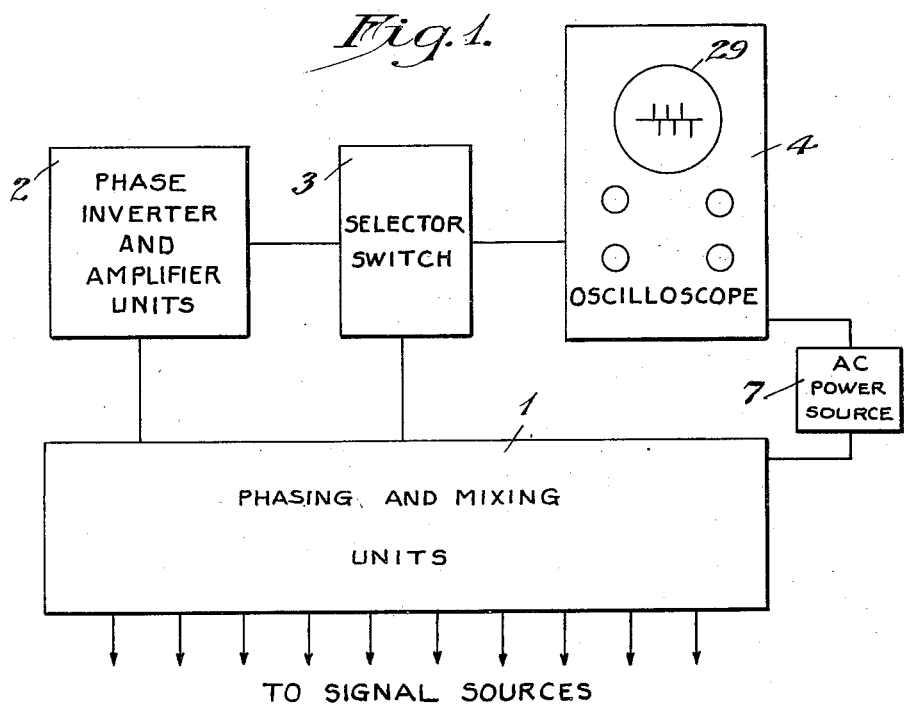
Fig. 1 is a block diagram showing a system according to the invention.

In Fig. 1, a block diagram of the system of the present invention is shown. The ten lines represented as connected to signal sources are intended to comprise connections to any units or mechanisms subject to variation in value which are to be measured or indicated. It is assumed in connection with this invention that if such values are initially not in electrical form, they are to be converted into electrical variations or signals before connection to the phasing and mixing units 1. In the phasing and mixing units of which there is one for each signal channel, the signals, which are assumed to be proportional to the values to be measured or indicated, are mixed with an alternating-current wave from a suitable power source 7. This current should be of constant frequency and fixed voltage. By means of the phasing and mixing units it is possible to vary the phase of the A. C. wave with respect to time and also with respect to the signal so that the signal occurs at any desired phase of the wave. The units 1 also include means for adjusting the amplitude of the mixed or modulated signal as well as the width of the resultant modulated signal which actually comprises a voltage peak, sometimes called a "toothpick" wave.

After passing through an appropriate selector switch 3 the signals in their modified form are impressed on an oscilloscope 4. By means of the selector switch it is possible to select any one or more of the signals to be reproduced on the oscilloscope. The alternating current wave which is modulated by the signals is furnished by a suitable A. C. power source 7 which, if connected to the oscilloscope 4 and to the mixing or modulating units 1 will synchronize the signals with the oscilloscope.

The indicating lines on the oscilloscope may be caused to extend from the zero or horizontal axis either up or down, or both up and down. For example, if the signals received from the mixing units are connected to the oscilloscope with such polarity that they cause vertical indications in an upward direction, certain or all of them may be reversed so that they extend downwardly by passing them through a phase inverter 2 which may also comprise an amplifier.

Figure 2:
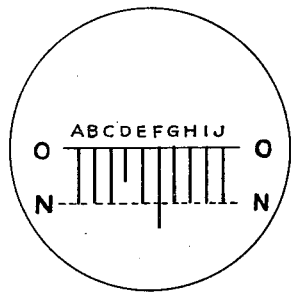
Figs. 2, 3 and 4 represent views of an oscilloscope dial or screen on which are represented three different types of indications according to the invention.

Fig. 2 illustrates a typical oscilloscope screen showing ten vertical lines extending downwardly from the zero axis 0—0. These lines may comprise indications of the values of various characteristics. For example, if the apparatus of the present invention be used in connection with an airplane these values might represent temperatures, pressures, vacuum, gallons, rate of flow, positions of control surfaces, speeds, propeller pitch, etc. By adjusting the relative phases and amplitudes of the signals, the indications on the oscilloscope may be made to appear as substantially straight lines and be substantially equally spaced, as shown. The gain or sensitivity adjustments which determine the amplitudes of the signals are in the illustrated instance, set so that all of the indications are of the same length. They extend from 0—0 line to the N—N line when the values represented by these indications are normal. As can be seen from Fig. 2, by a mere glance at the dial or screen of the oscilloscope one may observe the fact that all ten indications are normal, or on the other hand that certain thereof are abnormal. As specifically shown in Fig. 2, indication D is below normal and indication F is above normal, the eight remaining values being normal. If the magnitudes of the actual values represented by indications D and F are of importance the operator need then merely read the calibrated dials or indicators, as represented in Fig. 5 corresponding to indications D and F, which it is assumed would be included on the instrument panel.

Figure 3:
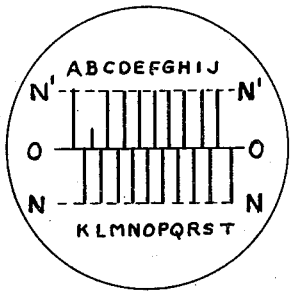

In the event that, say, 20 instruments or values are to be represented instead of 10 as in Fig. 2, it is necessary to add additional phasing and mixing units and to space the indications more closely along the horizontal axis of the oscilloscope screen. However, with a given oscilloscope having a screen of limited dimensions there is a practical limit to such multiplication of indications beyond which the separate indicating lines cannot readily be distinguished. In such event, the arrangement shown in Fig. 3 is an entirely practical solution. In this arrangement of the invention the adjacent lines are alternately extended up and down from the zero axis to permit twice as many indication lines without decreasing the spacing between the lines. This result is achieved by interposing in alternate signal channels a phase inverter unit 2 (Fig. 1), which results in one-half of the indicating lines extending up to line N'—N' and one-half of them extending down to line N—N from the zero axis.

Figure 4:
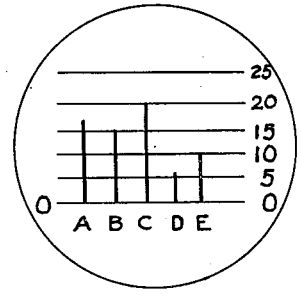

The invention also permits indication of the actual magnitudes of the values to be measured, as illustrated in Fig. 4. To this end the oscilloscope screen should be suitably calibrated so that the lengths of the reproduced lines indicate magnitudes of the values. Ordinarily the values thus indicated on the screen of a single oscilloscope should be in respect to the same units of measurement so that a single vertical calibration would serve for all. Such an arrangement is assumed in the illustration of Fig. 4 where the five values A, B, C, D and E, as shown, correspond to magnitudes of approximately 17, 15, 20, 6 and 10, respectively. The degree of accuracy of the readings as thus indicated is not necessarily very great, so it is best to interpret them as indications only of the order of magnitude.

Figure 5:
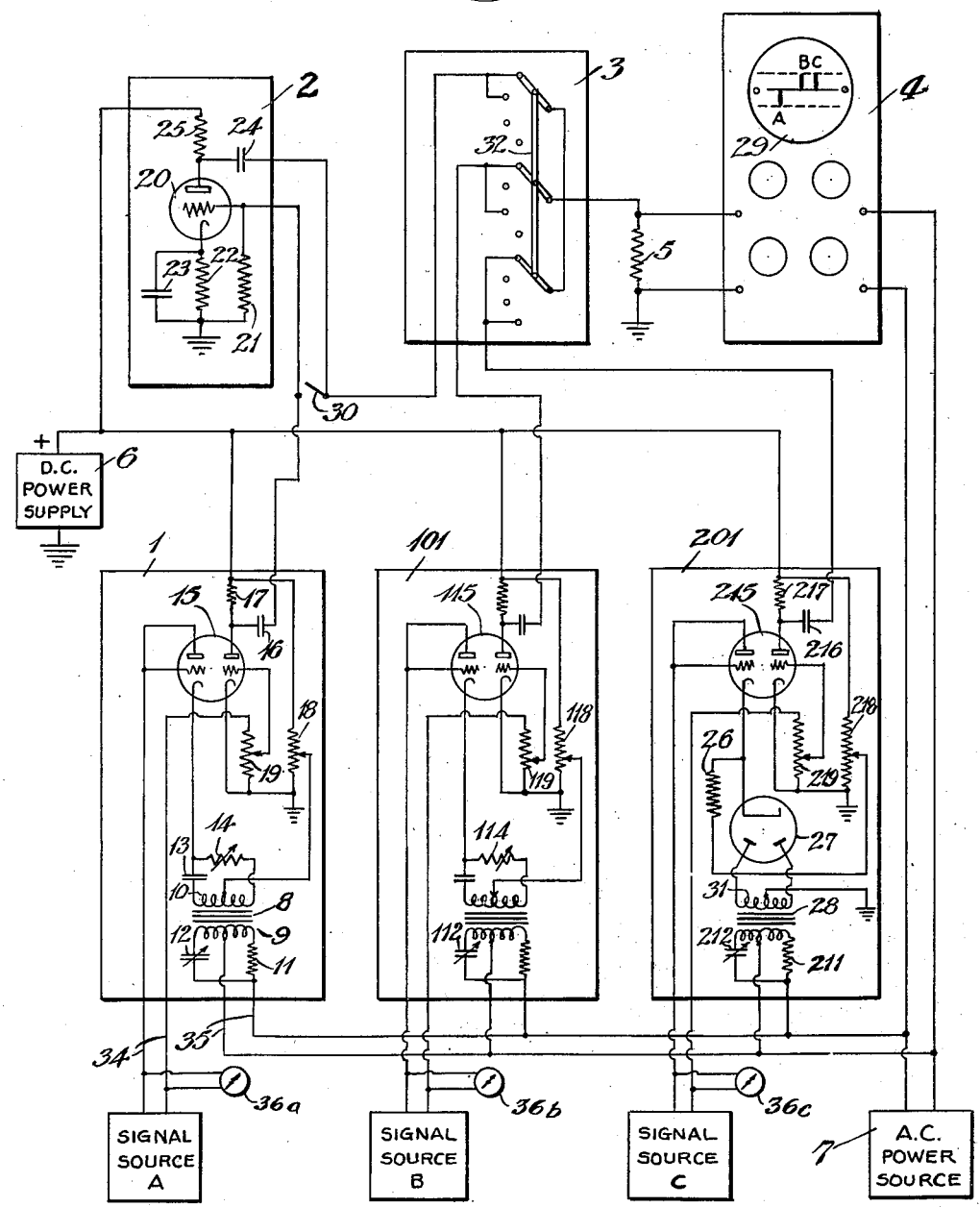
Fig. 5 is a circuit diagram showing in more detail a typical embodiment of the invention in simplified form.

A circuit diagram of a system in accordance with the present invention is illustrated in Fig. 5 wherein there are shown three signal sources, A, B and C, which may be assumed to comprise electrical signals as above described which are substantially proportional to values to be measured or indicated. Meters 36a, 36b and 36c of the usual type, by which the values may be indicated or measured directly, are shown connected to the respective signal sources. The signals from source A are fed to a signal phasing and mixing unit 1 which is also connected to alternating-current power source 7, assumed to furnish power at constant frequency and fixed voltage. Current from this power source is fed to primary winding 9 of transformer 8 by way of phase-shifting elements comprising resistance 11 and variable condenser 12. Across the terminals of secondary winding 10 are connected, in series, phase shifting elements comprising condenser 13 and variable resistance 14. The alternating-current potential furnished to unit 1 may be adjusted in phase by variation of either condenser 12 or resistance 14. Tube 15 comprises a double triode vacuum tube and may be of the type 6SN7. The left-hand section of the tube comprises a diode rectifier resulting from connecting together the anode and grid thereof. The signal from source A is rectified by the left-hand section of tube 15 to form unidirectional signal pulses, and a potential derived therefrom is developed across potentiometer resistor 19. The slider of this potentiometer is connected to the grid of the right-hand section of tube 15, permitting the adjustment of the amplitude of the signal potential impressed on this grid.

A potentiometer 18 is connected between the positive terminal of the anode current supply 6 and ground, the slider of this potentiometer being connected to the midpoint of secondary 10. As a result of these connections this element functions in the nature of a slideback voltmeter potentiometer. By suitable adjustment thereof it is possible to suppress the alternating potential developed across potentiometer 19 except for a narrow peak which then is applied to the grid of the triode section of tube 15. Thus, it is possible effectively to cancel the alternating-current component from the modulated and phase-adjusted alternating-current wave, leaving only the modulated or signal portion in the desired amplitude and phase. By careful adjustment of slideback potentiometer 18, of sensitivity control 19 and of phase adjustment 12 or 14, the shape and nature of the peak of the signal wave, especially its height and width, can be selected as desired. This peak would preferably comprise a thin line of selected length or height. By connecting the same power source 7 to all of the mixing units and to the oscilloscope, the reproduced signals may be synchronized with each other and with the oscilloscope sweep circuit. If the signal source, such as A, is disconnected from the tube 15 and is itself coupled to the power source 7, so that the alternating-current wave of the power source is already mixed with the signal, the phase shifting elements 11 and 12 and the connections 35 may be omitted, and the power signal source connected across the primary 9. The connections 34 would then be connected together. A circuit somewhat similar to that of phasing and mixing unit 1, by which the signal peak of a voltage wave may be "rolled back" to any desired phase of the alternating-current wave and reproduced alone, is described in my copending application Ser. No. 598,496, filed June 9, 1945, now Patent No. 2,401,493.

The signal after having been modified as above explained, may be inverted, viz., reversed in phase by 180°, by passing it through phase inverter and amplifier 2 to which the output of unit 1 is connected through coupling resistor 17 and condenser 16. If it be desired to impress the signal A directly upon oscilloscope 4 without inverting it, switch 30 may be closed to connect the output unit 1 directly to selector switch 3, and thence through coupling resistor 5 to the oscilloscope. The phase inverter 2 comprises elements well known in the electronic art and need not here be described in detail, except to state that in the illustrated embodiment, triode 20 may comprise a vacuum tube of the 6J5 type.

The signal phasing and mixing unit 101 is represented as identical to the unit 1 above described. The circuit elements thereof have, therefore, been given the same reference characters, plus 100. Unit 101 is independently connected to signal source B, and the output of unit 101 is directly connected to the central switch element of selector switch 3, and thence as before to oscilloscope 4.

Signal source C is likewise connected through its own independent channel to selector switch 3 and thence to oscilloscope 4. Signal phasing and mixing unit 201 to which signal source C is connected has the same function as units 1 and 101, but certain of the circuit elements therein are different from those of the units previously described. This arrangement is an alternative embodiment of that of units 1 and 101. In this instance the primary circuit of the coupling transformer 28 connected to the alternating-current power source 7 is the same as those of units 1 and 101, but the secondary 31 thereof is connected differently. Here the terminals are connected to the two anodes, respectively, of a double-diode tube 27 which, for example, may comprise a type 6H6 tube, and the midpoint is connected to ground. The slideback potentiometer 218 is connected in a manner equivalent to that of units 1 and 101 by virtue of the fact that the slider thereof is connected to the cathode of double diode 27. Certain features of this portion of the circuit resemble those of U. S. Letters Patent 2,152,680, granted April 4, 1939 to Thomas C. Hana. The remainder of the circuit arrangement of unit 201 is substantially identical to that of the corresponding units previously described and therefore need not be further discussed.

As in the case of the signal channel of signal source B, the signal channel of signal source C is separate from and independent of the other signal channels. Thus, the output of unit 201 is coupled directly to the oscilloscope 4 by way of signal selector switch 3. With the switch 3 set as indicated in the drawing, all three signal sources A, B and C are connected to the input of oscilloscope 4, resulting in the indications on the oscilloscope screen 29 represented in the drawing. This represents an indication A below the common axis 0—0 and two indications, B and C, above that axis. It will be clear that this inverted indication of the signal A results from the inclusion of phase inverter 2 in the signal A channel. Of course, with only three signal channels employed it would not ordinarily be necessary to utilize the phase inverter 2. This inverter is there included by way of illustration, it being understood that, as previously described, such inverters may be utilized to good effect in the alternate ones of one-half of the signal channels in the event that a large number of signals are employed, or otherwise if it is desired that certain of the signal indications be inverted.

Although selector switch 3 is not essential, its use is convenient in permitting the selection of one or more of the signals to be reproduced as desired on the oscilloscope screen. For instance, when the switch arm 32 is in the upper position as shown, all of the signal channels A, B and C are connected to the input of the oscilloscope. In the second or next lower position of switch 32 only signal source A is reproduced; in the third position only signal source B is reproduced; and in the fourth or lowest position of switch 32 only the signal source C is reproduced. By suitable changes in the connections to the switch contacts any desired signals or combinations thereof may readily be selected in a given case.

Below are listed values of elements of the circuit of Fig. 4 which may be employed in practicing the invention herein described. It is to be understood that these values as well as the data given above, are suggested solely by way of example, and not as a limitation of the invention defined by the appended claims.

*Resistors:*
   5—20 k. ohms
   11—5 k. ohms
   14—10 k. ohms.
   17—50 k. ohms
   18—10 k. ohms
   19—100 k. ohms
   21—1 meg.
   22—1 k. ohms
   25—50 k. ohms
   26—50 k. ohms

*Condensers:*
   12—.05 to 0.5 mfd. (var.)
   13—0.5 mfd.
   16—.05 mfd.
   23—10 mfd.
   24—.05 mfd.

What is claimed is:

1. In a multiple indicating system, a plurality of electric signal potential sources, each source representing a different value to be indicated, an oscilloscope, an alternating-current power source, a plurality of signal phasing and mixing units each having a power input, a signal input, a signal wave output and means for adjusting the amplitude of each signal and the phase of the power voltage with respect to each signal to produce signal waves, connections from said power source to the power inputs of said units and to said oscilloscope, a connection from each signal source to the signal input of a different one of said units, connections from the signal outputs of said units to said oscilloscope, and means for effectively simultaneously reproducing said signals on said oscilloscope in the form of lines spaced along and extending preselected distances from a common axis when said values are of normal magnitudes.

2. In a multiple indicating system, a plurality of electric signal potential sources, each source representing a different value to be indicated, an oscilloscope, an alternating-current power source, a plurality of signal phasing and mixing units each having a power input, a signal input, a signal wave output, means for adjusting the amplitude of each signal and the phase of the power voltage with respect to each signal to produce signal waves, and means for cancelling the alternating current components of the signal waves, connections from said power source to the power inputs of said units and to said oscilloscope, a connection from each signal source to the signal input of a different one of said units, switching means for selectively connecting any one or all of said signals to said oscilloscope, means coupling said switching means to said oscilloscope, and connections from the signal outputs of said units to said switching means, whereby any of the signals corresponding to said values may be separately reproduced on said oscilloscope effectively simultaneously in spaced relation and equal amplitude.

3. In a multiple indicating system, a plurality of electric signal potential sources, each source representing a different value to be indicated, an oscilloscope, an alternating-current power source, a plurality of signal phasing and mixing units each having a power input, a signal input, a signal output, means for adjusting the amplitude of each signal and the phase of the power voltage with respect to each signal to produce signal waves, and means for cancelling the alternating-current components of the signal waves, connections from said power source to the power inputs of said units and to said oscilloscope, a connection from each signal source to the signal input of a different one of said units, and connections from the signal outputs of said units to said oscilloscope, whereby signals corresponding to said values may be separately reproduced on said oscilloscope effectively simultaneously in spaced relation and equal amplitude, certain of said last named connections including a phase-inverter effective to invert limited portions of said signals with respect to the remaining signals.

4. In a multiple indicating system, a plurality of electric signal potential sources, each source representing a different value to be indicated, an oscilloscope, an alternating-current power source, a plurality of signal phasing and mixing units each having a power input, a signal input, a signal wave output and means for adjusting the amplitude of each signal and the phase of the power voltage with respect to each signal to produce signal waves, and means for cancelling the alternating-current components of the signal waves, connections from said power source to the power inputs of said units and to said oscilloscope, a connection from each signal source to the signal input of a different one of said units, switching means for selectively connecting any one or all of said signals to said oscilloscope, means coupling said switching means to said oscilloscope, and connections from the signal outputs of said units to said switching means whereby any of the signals corresponding to said values may be separately reproduced on said oscilloscope effectively simultaneously in spaced relation and equal amplitude, alternate ones of said last named connections including a phase-inverter whereby alternate signals are indicated as inverted with respect to the indications of the remaining signals.

5. In a multiple indicating system, a plurality of electrical signal potential sources, each source representing a different value to be indicated, an oscilloscope, an alternating-current power source, signal amplitude adjusting means connected between each signal source and said oscilloscope, phase adjusting means connected between said power source and said oscilloscope, said phase adjusting means including means for mixing signal voltage with power voltage at the frequency of said alternating-current source to produce a signal wave, means for cancelling the alternating-current component of the signal wave, means coupling said phase and amplitude adjusting means to said oscilloscope, and means for effectively simultaneously reproducing all of said signals on said oscilloscope in the form of lines spaced along and extending substantially equal distances from a common axis when said values are of substantially normal magnitudes.

THEODORE ZUSCHLAG.

REFERENCES CITED

The following references are of record in the file of this patent:

UNITED STATES PATENTS

| Number | Name | Date |
|---|---|---|
| 1,351,356 | Tucker | Aug. 31, 1920 |
| 2,048,081 | Riggs | July 21, 1936 |
| 2,089,430 | Roys | Aug. 10, 1937 |
| 2,394,196 | Morgan | Feb. 5, 1946 |
| 2,412,350 | Morgan | Dec. 10, 1946 |
| 2,418,116 | Greig | Apr. 1, 1947 |